United States Patent [19]
Bailey

[11] 3,795,891
[45] Mar. 5, 1974

[54] BATTERY TERMINAL
[76] Inventor: Albert Preston Bailey, P. O. Box 386, Santa Anna, Tex. 76878
[22] Filed: May 22, 1972
[21] Appl. No.: 255,208

[52] U.S. Cl. .......... 339/232, 339/268 R, 339/272 R
[51] Int. Cl. ............................................. H01r 11/26
[58] Field of Search ................... 339/224–240, 243, 339/268, 272

[56] References Cited
UNITED STATES PATENTS
| | | | |
|---|---|---|---|
| 3,009,128 | 11/1961 | DeCarlo | 339/272 R |
| 2,057,602 | 10/1936 | Wilson | 339/272 R |
| 1,738,157 | 12/1929 | Thurber | 339/240 |

FOREIGN PATENTS OR APPLICATIONS
| | | | |
|---|---|---|---|
| 130,767 | 11/1946 | Australia | 339/224 |
| 885,014 | 5/1943 | France | 339/272 R |
| 139,818 | 1/1951 | Australia | 339/224 |

Primary Examiner—Joseph H. McGlynn
Attorney, Agent, or Firm—Diller, Brown, Ramik & Wight

[57] ABSTRACT

This disclosure relates to battery terminals utilized for connecting cables to post of batteries. Each battery terminal is in the form of a block having a bore up through the underside thereof for receiving a battery post, the bore being threaded and being interlocked and being engageable with a battery post while the block serves to protect the battery post against corrosion. At the same time, the battery terminal is provided with means whereby one or two cables, without special ends, may be readily secured to the battery terminal.

11 Claims, 4 Drawing Figures

PATENTED MAR 5 1974 3,795,891

BATTERY TERMINAL

This invention relates in general to new and useful improvements in electrical connections, and more particularly to an improved battery terminal.

It is well known that in conjunction with existing battery terminals of motor vehicles corrosion remains a problem. In more recent years the battery terminals have been provided with a shield which protect the same. However, the shield is generally formed of a rubber-like material and slides down the cable and snaps into place. Half of the time the shield does not remain in place.

A typical example of corrosion is that when a heavy power drain is required, such as starting on a very cold morning, the corrosion between the battery post and the terminal restricts the power flow and prevents the starting of the internal combustion engine notwithstanding the fact that the battery does have sufficient charge.

Another problem of existing battery terminal arrangements is that even though the terminal may be of sufficient size to permit a partial eating away thereof by the corrosive acids, the cable connected to the terminal is often-times corroded and the net result is that the cable has to be replaced.

Further, in conjunction with large trucks and industrial vehicles, it is desirable in some instances to provide for the splitting of the voltage and in other instances to provide for a booster cable. Therefore, it is highly desirable that a battery terminal be capable of having connected thereto two cables.

SUMMARY OF THE INVENTION

In accordance with this invention, it is proposed to provide a battery terminal in the form of a generally rectangular block having formed in the underside thereof a bore for the reception of a battery post. The bore is internally threaded whereby the block may be rotated on the battery post and positively interlocked therewith. The upper end of the bore is closed with the result that the block completely covers the battery post and there is no entrance from the top into the connection between the battery post and the battery terminal. Since the battery post is completely covered by the battery terminal block, corrosion, for all practical purposes, is eliminated and a good positive connection between the battery post and the battery terminal is maintained.

It is also proposed that the threaded bore for receiving the battery post be of a straight bore type whereby the bore will receive battery posts of different tapers within the same general size range and a positive connection can be obtained between the battery terminal and these various tapered posts.

Another feature of the battery terminal is that the block is provided with a bore which is preferably offset from the battery post receiving bore and which is generally normal to the axis of the battery post receiving bore and opens to one side wall of the battery terminal block, this opening being for the reception of a cable and is adapted to have received in the bare cable portion of a covered cable. The battery terminal block is provided with a still further bore which receives the cable receiving bore, which further bore is threaded and is provided with a set or clamping screw projectable into the cable receiving bore and engageable with a cable to positively clamp the cable in place and provide for a positive electrical connection between the cable and the battery terminal block.

If desired, the battery terminal block may be provided with two or more such cable receiving bores whereby a plurality of cables may be connected to a single battery post, the extra cables being for the purpose of splitting voltage in high voltage systems or for the purpose of providing a permanent booster cable arrangement.

With the above and other objects in view that will hereinafter appear, the nature of the invention will be more clearly understood by a reference to the following detailed description, the appended claims and the several views illustrated in the accompanying drawings.

Figure 1:
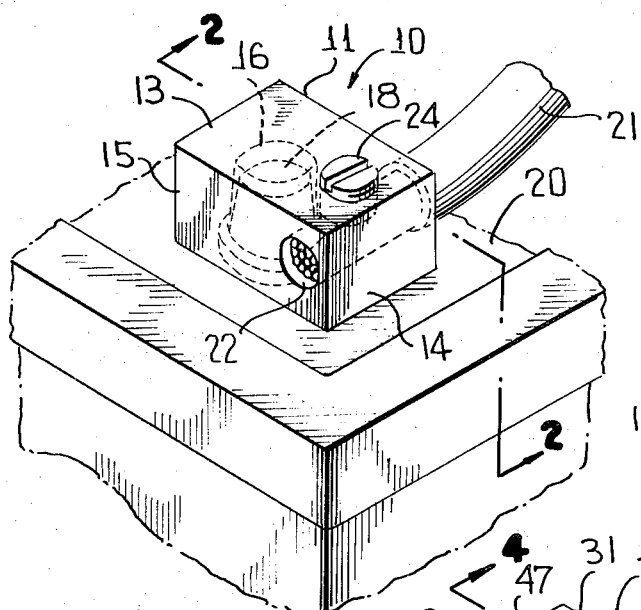
FIG. 1 is a top fragmentary perspective view of a battery having mounted on one of the posts thereof a single embodiment battery terminal formed in accordance with this invention.
Figure 2:
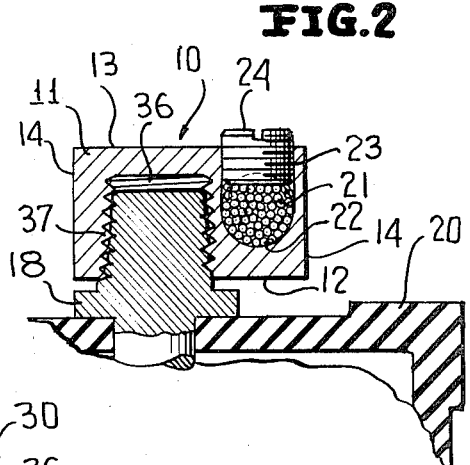
FIG. 2 is an enlarged fragmentary vertical sectional view taken along the line 2—2 of FIG. 1 and shows specifically the details of the battery terminal.

Referring now to the drawings in detail, it will be seen that there is illustrated in FIGS. 1 and 2 a first form of battery terminal formed in accordance with this invention, the battery terminal being generally identified by the numeral 10. The battery terminal 10 is in the form of a generally rectangular block 11 which includes an under surface 12, an upper surface 13, a pair of end surfaces 14 and a pair of side surfaces 15.

The under surface 12 has formed therethrough a bore 16 extending towards the upper surface 13 but terminating short thereof. The bore 16 is a cylindrical bore and is provided with internal threads 17.

Referring now to FIG. 1 in particular, it will be seen that the battery terminal 10 is mounted on a post 18 of a battery 20. It is recognized that battery posts come in different diameters and with different tapers. It will therefore be necessary to provide battery terminals 10 having post receiving bores 16 of different diameters. On the other hand, by forming the bore 16 as a straight bore and by providing the threads 17 as relatively coarse threads, a single battery terminal block 11 may be threadedly engaged on a variety of different post configurations and still provide the necessary mechanical and electrical interlock between the terminal block 11 and the battery post 18. At the same time, since the terminal block 11 completely overlies the battery post 18, for all practical purposes corrosion at the connection between the battery post 18 and the battery is prevented.

In order that the cable normally leading from the battery terminal, cable 21, may be of the replaceable type and also to assure a good and constant electrical connection between the cable and the battery terminal, the terminal block 11 is provided with a bore 22 which is offset from the bore 16 preferably opens through one of the side edges or walls 15. In the illustrated form of the invention, the bore 22 extends entirely through the terminal block 11. The bore 22 is of a size to receive the bare cable, that is, an end portion of the cable 21 from which the insulation conventionally provided on such cable removed.

In order that the cable end may be clamped in place relative to the terminal block 11 and at the same time a good electrical connection assured, a threaded bore 23 is provided in the terminal block 11 generally normal to the bore 22 and opening thereinto. While the threaded bore 23 is illustrated as opening through the upper surface 13 of the terminal block 11, it is readily apparent that it could equally as well open through the adjacent end surface or possibly through the under surface although the under surface would be the least desirable of the three positions because this would require the removal of the terminal block 11 from the battery post for the disconnecting or replacement of the cable 21. The threaded bore 23 has threadedly engaged therein a clamp screw or set screw 24 which is in direct engagement with the bore cable 21 and serves both to clamp the cable in position relative to the terminal block 11 and to provide an electrical connection between the cable 21 and the terminal block 11.

Figure 3:
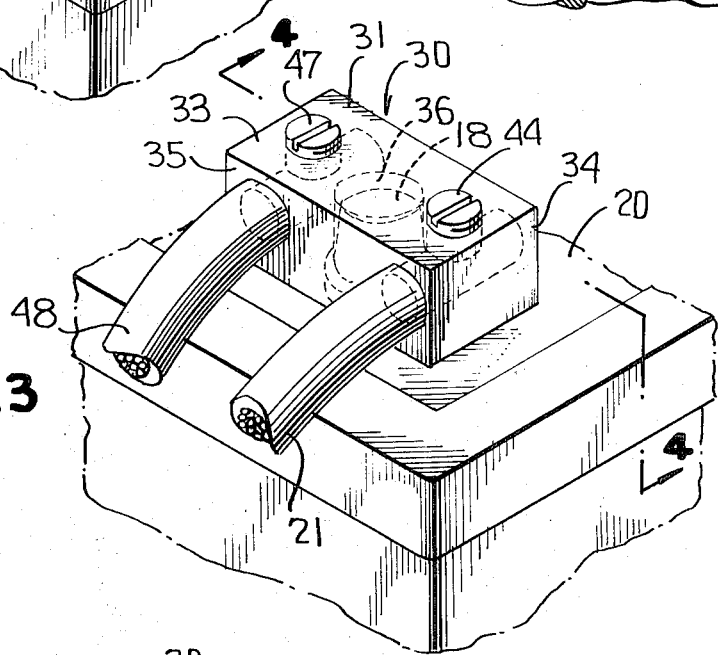
FIG. 3 is a fragmentary top perspective view similar to FIG. 1 and shows a multiple cable modification of the battery terminal.
Figure 4:
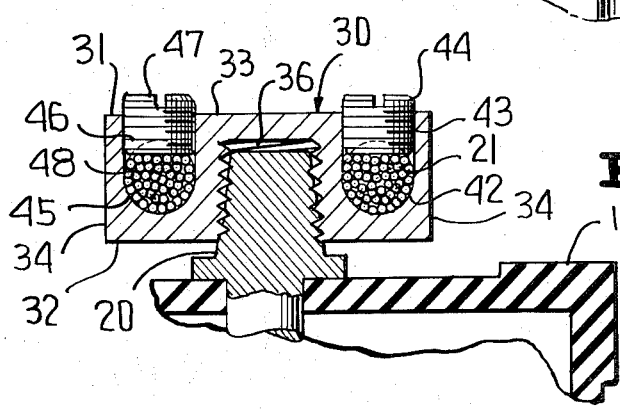
FIG. 4 is an enlarged fragmentary vertical sectional view taken along the line 4—4 of FIG. 3 and shows further the details of that battery terminal.

Referring now to FIGS. 3 and 4 in particular, it will be seen that the battery 20 has mounted on the battery post 18 thereof a modified form of battery terminal which is generally identified by the numeral 30. The battery terminal 30 includes a terminal block 31 which is generally rectangular in outline and which has an under surface 32, an upper surface 33, end surfaces 34 and side surfaces 35. Like the terminal block 11, the terminal block 31 is provided with a cylindrical bore 36 in the under surface thereof, which bore is provided with threads 37 for interlocking engagement with the battery post 18. However, because the terminal block 31 is longer than the terminal block 11, the battery post receiving bore 36 is generally centered.

At one side of the bore 36 is a cable receiving bore 42 which corresponds to the cable receiving bore 22 and which has received therein a bared end portion of a cable which corresponds to the cable 21. Associated with the cable receiving bore 42 is a threaded bore 43 in which a clamp screw or set screw 44 is threadedly engaged and which serves to clamp the bare end portion of the cable 21 within the bore 42.

On the side of the terminal block 31 on the opposite side of the bore 36 from the cable receiving bore 42 is a second cable receiving bore 45. The cable receiving bore 45 has associated therewith an internally threaded bore 46 in which there is threaded a clamp screw or set screw 47. The clamp screw 47 clamps a bare end of a further cable 48 in the bore 45 in the manner described above with respect to the cable 21 and the bore 22.

The cable 48 may be utilized for several purposes. In some instances it may be utilized as a booster cable and the opposite end thereof (not shown) may be provided with a suitable fitting for that purpose. On the other hand, when the battery is of a high voltage type or is part of a high voltage system, the cable 48 may be part of a voltage divider system for operating accessories having a lower voltage requirement.

It will be readily apparent that the terminals 10 and 30 may be rotated further from the positions illustrated in FIGS. 1 and 3 in accordance with the placement requirement of the particular installation. Accordingly, the battery terminals 10 and 30 have found particular installation advantages with respect to tractors, trucks and industrial engines of all types. Further, the battery terminal construction is such that one may readily replace a worn or otherwise defective cable without requiring the removal of the battery terminal from the battery post or the replacement of the battery terminal.

It is to be understood that the terminal blocks may be formed of any suitable material including steel, stainless steel, monel, brass, bronze, copper and lead.

Although only several preferred embodiments of the invention have been specifically illustrated and described herein, it is to be understood that minor variations may be made in the battery terminals without departing from the spirit and scope of the invention, as defined by the appended claims.

I claim:

1. A new article of manufacture comprising a battery terminal for mounting on a battery post, said battery terminal including generally a block having an under surface, an upper surface, and edge faces extending between said under surface and said upper surface, a first bore means in said block opening through only said under surface for the reception of a battery post, said first bore being internally threaded for threaded engagement with a battery post, a second bore means in said block for receiving a bare cable end separate and apart from the reception of a battery terminal by said first bore means, and clamp means carried by said block for grippingly engaging a cable, said second bore means extending alongside said first bore means generally in overlapping relation, and said first and second bore means have axes arranged non-coplanar.

2. The battery terminal of claim 1 wherein said first and second bore means axes are disposed in angular relation.

3. The battery terminal of claim 1 wherein said second bore means opens through both of said edge faces.

4. The battery terminal of claim 1 wherein said clamp means includes a third bore means in said block intersecting said second bore means, said third bore means being internally threaded and having a clamping element threaded therein.

5. The battery terminal of claim 4 wherein said third bore means opens through said upper surface for the release of a cable while said battery terminal remains attached to a battery post.

6. The battery terminal of claim 1 wherein said first bore means terminates short of said upper surface and said first bore means is generally of a height corresponding to the length of an internal battery terminal whereby a battery post carrying said battery terminal is fully protected thereby.

7. The battery terminal of claim 6 wherein said first bore is of the straight bore means type for receiving conventional tapered battery posts of different tapers.

8. The battery terminal of claim 1 wherein there is a third bore means for receiving a second cable, said second and third bore means being disposed on opposite sides of said first bore means, and separate second clamp means carried by said block for gripping a second cable disposed in said third bore means.

9. The battery terminal of claim 8 wherein one cable connected to said block is a booster cable.

10. The battery terminal of claim 8 wherein said block is rectangular in outline and said edge faces are disposed longitudinally of said block.

11. The battery terminal of claim 10 wherein said second and third bore means extend entirely through said block.

* * * * *